(12) United States Patent
Bousquet et al.

(10) Patent No.: US 9,817,972 B2
(45) Date of Patent: Nov. 14, 2017

(54) ELECTRONIC ASSEMBLY COMPRISING A DISABLING MODULE

(71) Applicant: OBERTHUR TECHNOLOGIES, Colombes (FR)

(72) Inventors: Nicolas Bousquet, Colombes (FR); Yannick Sierra, Colombes (FR)

(73) Assignee: OBERTHUR TECHNOLOGIES, Colombes (FR)

( * ) Notice: Subject to any disclaimer, the term of this patent is extended or adjusted under 35 U.S.C. 154(b) by 0 days.

(21) Appl. No.: 15/044,652

(22) Filed: Feb. 16, 2016

(65) Prior Publication Data

US 2016/0162687 A1 Jun. 9, 2016

Related U.S. Application Data

(63) Continuation of application No. 14/089,283, filed on Nov. 25, 2013, now abandoned.

(30) Foreign Application Priority Data

Nov. 27, 2012 (FR) ...................................... 12 61301

(51) Int. Cl.
*G06F 9/00* (2006.01)
*G06F 21/56* (2013.01)
(Continued)

(52) U.S. Cl.
CPC .............. *G06F 21/56* (2013.01); *G06F 11/28* (2013.01); *G06F 21/55* (2013.01); *G06F 21/57* (2013.01); *G06F 21/629* (2013.01); *H04W 12/12* (2013.01)

(58) Field of Classification Search
CPC ........ G06F 21/57; G06F 21/629; G06F 21/55; G06F 11/28; H04W 12/12
(Continued)

(56) References Cited

U.S. PATENT DOCUMENTS

2002/0186845 A1 12/2002 Dutta et al.
2005/0186954 A1* 8/2005 Kenney .................. H04M 1/67
455/420

(Continued)

FOREIGN PATENT DOCUMENTS

WO 0127770 4/2001
WO 2008017796 2/2008

OTHER PUBLICATIONS

Search Report dated Aug. 22, 2013 from French Application No. 1261301 filed Nov. 27, 2012, pp. 1-2.
(Continued)

*Primary Examiner* — Mohammad W Reza
(74) *Attorney, Agent, or Firm* — MH2 Technology Law Group, LLP

(57) ABSTRACT

An electronic assembly for an electronic device may include a detection module to detect a security anomaly of a Rich-OS operating system and a disabling module to disable at least one secure function of the electronic device in response to the detection. The disablement nevertheless allows use of the electronic device in fail-soft mode. The electronic assembly may be implemented such that these two modules are dependent on a trusted operating system, and the trusted operating system and the Rich-OS operating system may be stored in a memory of the electronic assembly and executed on the electronic assembly.

13 Claims, 3 Drawing Sheets

(51) Int. Cl.
*G06F 21/55* (2013.01)
*G06F 21/57* (2013.01)
*G06F 11/28* (2006.01)
*H04W 12/12* (2009.01)
*G06F 21/62* (2013.01)

(58) Field of Classification Search
USPC .......................................................... 726/23
See application file for complete search history.

(56) References Cited

U.S. PATENT DOCUMENTS

| | | |
|---|---|---|
| 2007/0118558 A1 | 5/2007 | Kahandaliyanage |
| 2011/0035808 A1* | 2/2011 | Butler ................... G06F 21/575 726/27 |
| 2012/0137364 A1* | 5/2012 | Blaisdell ............... G06F 21/577 726/22 |
| 2014/0150104 A1 | 5/2014 | Bousquet et al. |

OTHER PUBLICATIONS

Non-Final Office Action dated May 22, 2015, U.S. Appl. No. 14/089,283, pp. 1-12.
Notice of Allowance dated Nov. 16, 2015, U.S. Appl. No. 14/089,283, pp. 1-19.

\* cited by examiner

ELECTRONIC ASSEMBLY COMPRISING A DISABLING MODULE

CROSS-REFERENCE TO RELATED APPLICATIONS

This application is a continuation of and claims the benefit of U.S. patent application Ser. No. 14/089,283 filed on 25 Nov. 2013 (pending), which claims priority to French Patent Application No. 1261301 filed Nov. 27, 2012, the entire disclosures of which are hereby incorporated by reference in their entireties.

BACKGROUND OF THE INVENTION

The present invention lies within the field of securing electronic devices e.g. terminals or smartcards, comprising several execution environments of which at least one is a trusted execution environment and another is a Rich-OS execution environment.

A trusted execution environment is implemented by means of a secure processor, possibly being a processor dedicated to this task or possibly having other functions, and a secure rewrite non-volatile memory; it is based on a trusted operating system. Therefore applications depending on the trusted operating system originate from trusted or certified sources over which the user of the terminal has no control.

Similarly, a Rich-OS execution environment is based on a rich operating system allowing the execution of applications of various origins such as the Internet.

These two operating systems may be executed for example on one same chipset of the terminal.

In addition, the trusted operating system has a secure start-up mechanism which verifies that the electronic device starts up in trusted state, by verifying the integrity of the code executed on the electronic device, in particular the code of the trusted operating system. The trusted operating system starts up before any other operating system starts up beforehand.

If the Rich-OS operating system is corrupt the security of terminal data is no longer guaranteed. To solve this problem, it is known fully to disable the Rich-OS operating system. However this is not a convenient solution for human users since they can no longer use their terminal which is evidently not desirable especially in the event of an emergency (call to an emergency number impossible).

Also, electronic devices are known which comprise secure elements such as a SIM (UICC) card which is a removable secure element, or an embedded secure element eSE.

Document US 2002/0186845 proposes a system for disabling access to a secure element of a terminal by sending a blocking message via radio, nevertheless allowing the use of some functions of the terminal which then functions in fail-soft mode.

However, in the solution disclosed by this document, the task of signalling a security anomaly is up to the user of the terminal and securing of the terminal only takes place insofar as it is requested by the user. Therefore, when the terminal encounters a security anomaly transparent to the user i.e. which goes unnoticed, securing of the terminal does not take place. In addition, the solution proposed in the aforementioned document entails the need to be able to receive a radio signal. Therefore in the case in which the user uses the terminal with insufficient network connection (e.g. network hole or faulty network) or no network connection (e.g. in aircraft mode) securing of the terminal cannot be made.

As a result there is a need to improve on existing methods for securing electronic devices.

OBJECTIVE AND SUMMARY OF THE INVENTION

The present invention mainly sets out to solve the above-mentioned drawbacks.

For this purpose the invention concerns an electronic assembly for electronic device, a trusted operating system and a Rich-OS operating system memorised in a memory of this electronic assembly executed thereupon, and the electronic assembly comprising a module detecting a security anomaly of the Rich-OS operating system and a module to disable at least one secure function of the terminal in response to this detected anomaly, these two modules being implementation-dependent on the trusted operating system, the disablement nevertheless allowing use of the electronic device in fail-soft mode.

The invention also concerns a method for securing an electronic device on which a trusted operating system and a Rich-OS operating system are executed. The implementation of this method is dependent on the trusted operating system and comprises a step to detect an anomaly of the Rich-OS operating system and, in response to this detection step, a step to disable at least one secure function of the electronic device. The disablement step nevertheless allows use of the electronic device in fail-soft mode.

The invention additionally concerns a terminal comprising an electronic assembly such as aforementioned. This terminal may a mobile telephone for example but also a touchpad or laptop computer. As a variant, the terminal may be a self-standing or embedded intelligent system widely used in architectures of machine-to-machine type, such as the on-board computer of a vehicle for example.

As a variant it may be smartcard.

The invention therefore enables a user of a device to make use thereof in secure manner, firstly because the invention provides for securing of the device when a security anomaly is detected, and secondly because securing of the device nonetheless allows the user to use some functions of the device which then functions in fail-soft mode. Since implementation of the method is dependent on the trusted operating system, the user is able to use the above-mentioned device in full security and reliably. In the solution proposed in the prior art (US 2002/0186845), the security of the device is based on user alertness to any security anomalies which may be encountered by the device, contrary to the present invention which directly entrusts the security of the device with the trusted operating system and the applications thereof.

In one particular embodiment of the invention, the secure function is either an application of a secure element executed by the electronic device, or an access function to access sensitive data of a secure element, e.g. cryptographic keys, this sensitive data being accessible to the electronic device.

Therefore the securing of the device is obtained so that non-secure functions still remain available.

For example, in the case of a mobile telephone, the user is able for example to make calls with the terminal even if some secure functions e.g. payment functions are disabled.

In one particular embodiment of the invention, the security anomaly is corruption of the Rich-OS operating system.

Corruption of the Rich-OS operating system may be automatically and/or systematically detected by an integrity verifying module.

Corruption of the Rich-OS operating system being a harmful phenomenon and often invisible to the user of the electronic device, the invention in this embodiment allows the necessary security steps to be taken to reduce this inconvenience.

In another embodiment of the invention, the detecting module is able to receive a message containing a securing command.

This embodiment has the advantage of being able to be remotely initiated. It is of particular advantage for example to secure a stolen or lost electronic device.

In one particular embodiment of the invention, the disabling module is capable of sending an application disablement command to this application, and of waiting for acknowledgement of disablement of this application. The trusted operating system takes the necessary steps to ensure the security of the electronic device if acknowledgement is negative.

Therefore, in the event of failure of disablement, the trusted operating system is nevertheless able to take the necessary steps to ensure the security of the electronic device.

In one particular embodiment of the invention, the detecting module is activated in response to verification of the security of the electronic device, this being triggered:
on the initiative of the trusted operating system, on start-up of the electronic device or at regular intervals; or
on the initiative of a user of the electronic device.

One advantage of this embodiment is that the securing of the electronic device takes place automatically from the user's viewpoint, when verification is conducted on the initiative of the trusted operating system.

A further advantage of this embodiment is that the user of the electronic device, when doubting the security of the electronic device, is also able to initiate verification. This advantage is of particular interest when the user's electronic device has been lost or stolen, or when the user has conducted operations making his terminal vulnerable such as downloading a dubious application.

In one particular embodiment of the invention, the steps of the aforementioned method are determined by the instructions of a computer program.

The invention therefore also concerns a computer program containing instructions for implementing the steps of the method such as described above, when the program is executed by a processor.

This program may use any programming language, in the form of a source code or object code for example. The program may be compiled and/or interpreted or in any other form interpretable by a processor.

In one particular embodiment of the invention, this computer program is the trusted operating system.

In another embodiment of the invention, this computer program is a patch on the trusted operating system. This patch has the advantage of enriching existing API substrates and forms an alternative to a native application of the trusted operating system when said application is unable to propose some services when deployed, or to a native application which cannot be deployed. Said patch therefore proposes additional functionalities to those initially proposed by the trusted operating system.

The invention also concerns a data medium readable by a computer and comprising the instructions of a computer program such as mentioned above.

This data medium may be any entity or device, embedded or removable, capable of storing the program. For example, the medium may be a storage medium such as a ROM memory, CD-ROM or ROM of a micro-electronic circuit, or magnetic recording means e.g. a hard disk, or a memory of flash or RAM type.

In addition, the data medium may be a transmissible medium such as an electrical or optical signal which can be conveyed via an electrical or optical cable, via radio or via other means. The program of the invention may in particular be downloaded into an on-line storage space or onto an Internet platform.

Alternatively, the storage medium may be an integrated circuit in which the computer program is incorporated, the circuit being adapted to execute or to be used in the execution of the method under consideration.

BRIEF DESCRIPTION OF THE DRAWINGS

Other characteristics and advantages of the present invention will become apparent from the description given below with reference to the appended drawings illustrating an example of embodiment thereof that is in no way limiting. In the Figures.

DETAILED DESCRIPTION OF THE INVENTION

Figure 1:
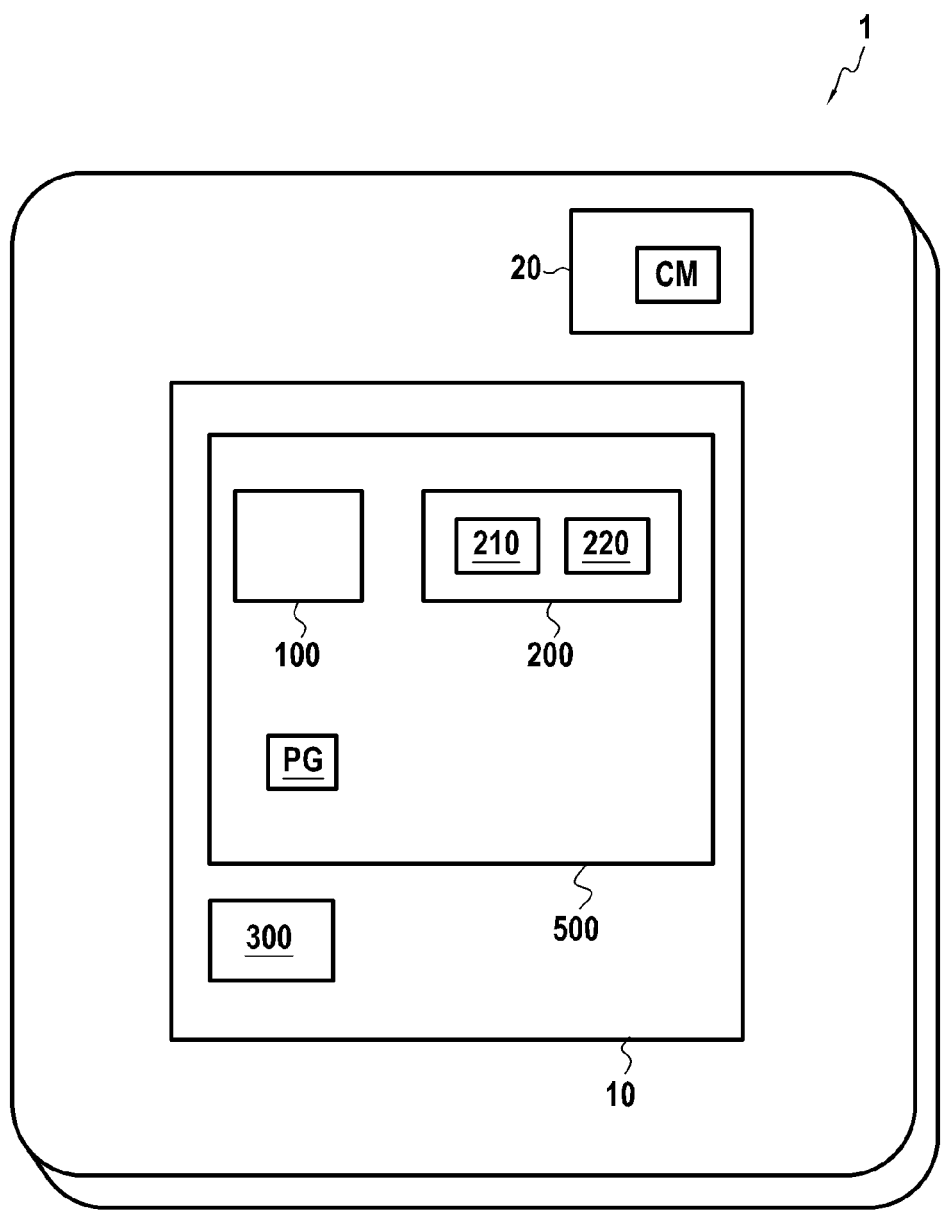
FIG. 1 schematically illustrates an electronic device according to one embodiment of the invention.

FIG. 1 illustrates an electronic device 1 according to one embodiment of the invention. In this example, the electronic device is a terminal e.g. a touchpad, laptop computer or a mobile telephone.

As a variant, it could have been a device of machine-to-machine type, such as a computer on-board a vehicle, or a smartcard such as a bank card or an electronic identity document.

In the example in FIG. 1, the terminal comprises an electronic assembly 10 conforming to the invention and a secure element 20.

In this example, the electronic assembly itself 10 comprises a processor 300 and a memory 500 in which in particular the code of two operating systems is stored, namely that of a Rich-OS operating system referenced 100 and that of a trusted operating system referenced 200.

These two operating systems are jointly started up, on start-up of the terminal 1. As is known to persons skilled in the art, the secure execution environment of the trusted operating system 200 has a secure start-up mechanism (Secure Boot) whereby the trusted operating system 200 is authenticated and then initialised i.e. launched, followed by start-up of the Rich-OS operating system 100.

More specifically, the Secure Boot is a chain of steps leading to complete start-up of the terminal, each step validating the following. For example, step i+1 is only triggered if step i validates the transition.

However active operation, in opposition to stand-by, of each of the operating systems is exclusive. That is to say that when one of the operating systems is active, the other is in inactive mode.

In this example, the trusted operating system 200 comprises a detection module to detect a security anomaly referenced 210, and a disabling module 220. When the trusted operating system detects a security anomaly by means of module 210, the disabling module 220 is in turn set in operation.

Also, the secure element may be a smartcard connected to the terminal by a reader e.g. a SIM card, or an integrated circuit whose connection pads are connected to the terminal such as an eSE for example.

In general, a secure element meets the security criteria: Common Criteria as per standard ISO/CEI 15408, ISO 7816 and/or standard FIPS 140, and stores data and sensitive applications such as applications dedicated to contactless payment via NFC (Near Field Communication). In this example, the secure element 20 is a SIM card allowing the terminal to communicate in particular via a mobile network. The trusted operating system 200 is able directly i.e. without mobilising the Rich-OS operating system, to access applications stored in the SIM card 20. This SIM card 20 comprises a component CM in charge of managing applications (Card Manager) stored in the SIM card 20. This Card Manager CM may be an application of the SIM card 20. In particular it ensures the routing of frames of APDU type conforming to standard ISO 7816.

Therefore, when a security anomaly is detected, and the trusted operating system by means of the disabling module 220 sends a disabling instruction to disable all the applications of a specific type for example, e.g. applications dedicated to payment, the Card Manager CM routes the disabling instruction towards the different applications concerned, namely in this precise example the applications dedicated to payment.

In this example, only the disabling of secure functions of the SIM card 20 has been described. However, the invention also concerns the securing of a terminal comprising several secure elements, each containing secure functions to be disabled. In this configuration, a list of these secure elements and of their applications is memorised in a non-volatile memory controlled by the trusted operating system 200.

Figure 2:
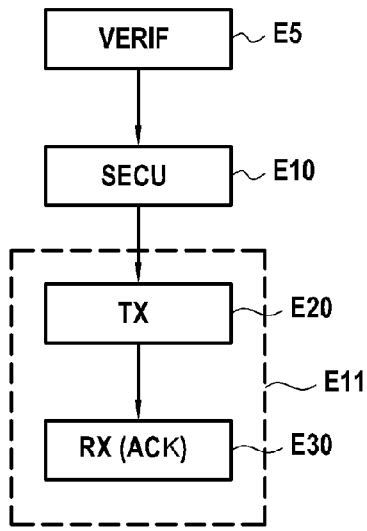
FIG. 2 schematically illustrates a method according to one particular embodiment of the invention.

FIG. 2 illustrates the main steps of a method according to one particular embodiment of the invention, whose implementation is dependent on a trusted operating system 200 in a terminal 1 such as previously described with reference to FIG. 1.

At a step E5, a particular application of the trusted operating system verifies the integrity of the Rich-OS operating system.

In this example, the method is implemented on the initiative of the trusted operating system 200, on secure start-up of the terminal 1 such as described above.

As a variant, the method could have been implemented on the initiative of the trusted operating system 200 on a regular basis by means of a clock or else on the initiative of the user of the terminal 1, or even on receipt of a polling command.

In manner known to persons skilled in the art, the verification of the integrity of an operating system entails on-the-fly calculation of the fingerprint of a specific series of octets in each level of this system (e.g. the core, the native libraries, execution environment, applications), then of comparing this fingerprint with a reference fingerprint for example by applying the SHA-1 algorithm well-known to skilled persons.

At step E10, the particular application in charge of verifying the integrity of the Rich-OS operating system ascertains that this system is corrupt.

In practice when said corruption is ascertained, information on the security anomaly is memorised in a non-volatile memory controlled by the trusted operating system 200, so that a particular application of this operating system 200, capable of reading this information, sets in operation the disabling step E11 to disable at least one secure function of the terminal.

In the particular case in which the terminal comprises several secure elements whose list is memorised in a non-volatile memory controlled by the trusted operating system 200, a particular application of this operating system 200 reads the list and initiates the disabling step E11 for each application to be disabled of each secure element in the list.

Returning to FIG. 2, the disabling step E11 comprises a step E20 to send a disabling instruction directly in this example to a sensitive application of the SIM card 20, and a wait step E30 to wait for acknowledgement ACK given by the application under consideration.

Communications (sending and receipt of the instruction, and acknowledgement) take place using the APDU protocol for example conforming to standard ISO 7816.

Figure 3:
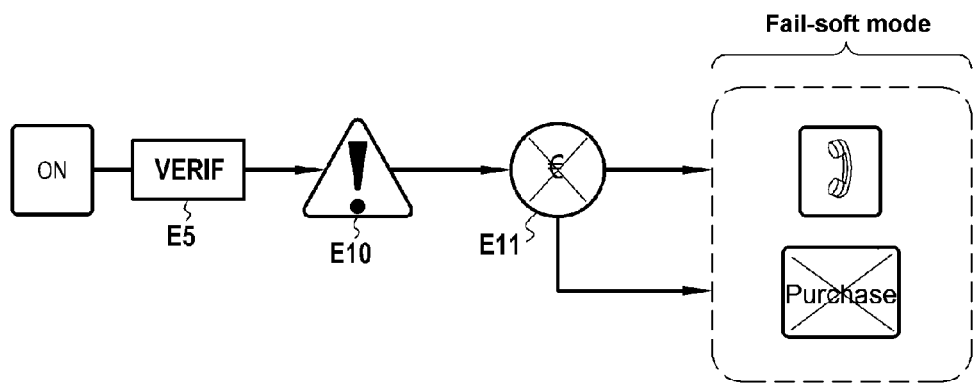
FIG. 3 schematically illustrates a scenario of use of the method according to the embodiment of the invention shown in FIG. 2.

FIG. 3 schematically illustrates a scenario of use integrating the method according to the embodiment previously described with reference to FIG. 2.

In this scenario, the user switches on the terminal 1. At step E5, a particular application of the trusted operating system verifies the integrity of the Rich-OS operating system.

The trusted operating system ascertains that the Rich-OS operating system is corrupt (step E10) and starts to disable (step E11) payment applications of the SIM card and access to cryptographic keys present on the SIM card 20. The applications of the Rich-OS operating system using payment applications on the SIM card 20, e.g. electronic commerce or purchase applications, then remain accessible to the user of the terminal 1 but the payment actions using the applications of the SIM card or the cryptographic keys are no longer possible.

Figure 4:
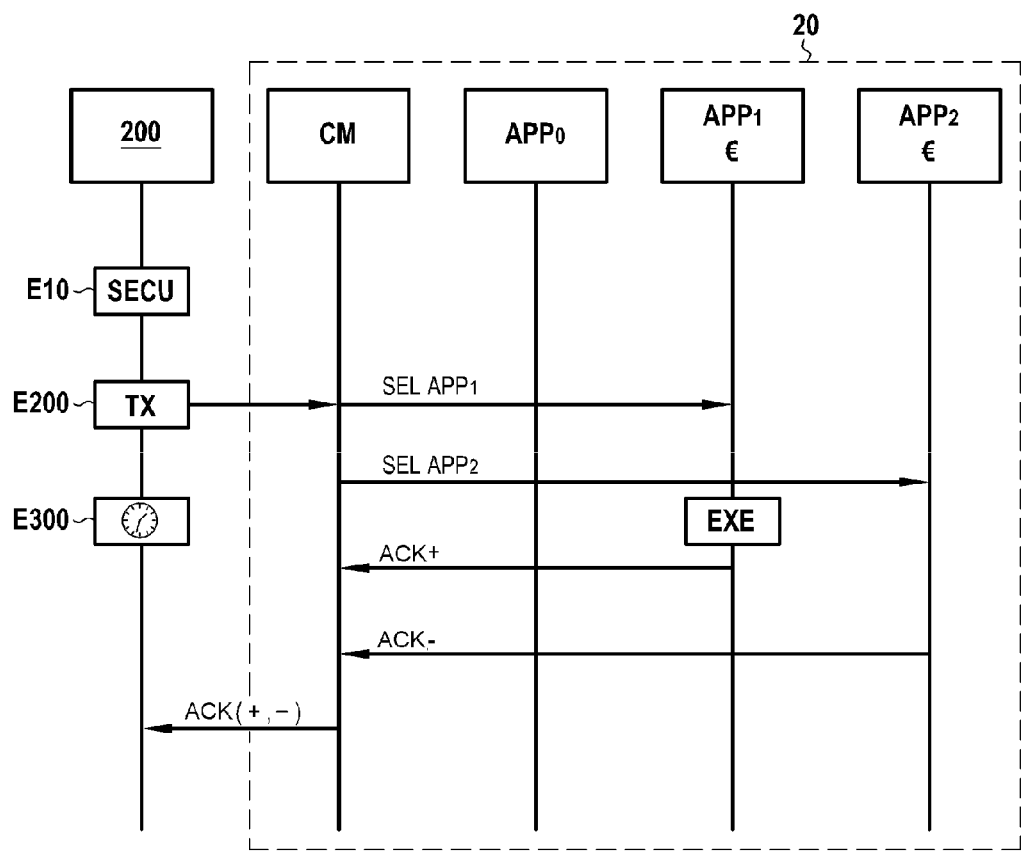
FIG. 4 is a flow chart illustrating a method according to another embodiment of the invention.

In this example, these applications of the Rich-OS operating system have direct access to the SIM card 20. The user later uses the terminal 1 to make a call via the mobile network. This call is able to take place since solely the secure payment applications stored on the SIM card 20 are blocked. On the other hand, the user can no longer fully use the purchase and electronic commerce applications. This partial use of the terminal is termed fail-soft mode FIG. 4 illustrates the main steps of a method according to another embodiment of the invention, which can also be implemented by a trusted operating system 200 in a terminal 1 such as previously described with reference to FIG. 1.

In addition, in this example, the SIM card comprises three applications $APP_0$, $APP_1$ and $APP_2$, the last two being payment applications.

At step E10, the trusted operating system 200 receives a message containing a command to disable payment applications stored on the SIM card 20.

At step E200, it sends an instruction to disable payment applications to the Card Manager CM which:

does not select the $APP_0$ application since it is not a payment application;

selects the $APP_1$ application and $APP_2$ application, these both being dedicated to payment.

In practice, the disabling instruction is in the form of an APDU frame and the Card Manager CM selects the applications as per their unique AID identifier (Application IDendifier) in accordance with standard ISO 7816.

The Card Manager therefore transmits the APDU frame containing the disabling instruction to the selected applications, namely APP₁ and APP₂.

The APP₁ application successively carries out disablement and sends a positive acknowledgement ACK+ whilst the disabling of application APP₂ fails, hence the sending of a negative acknowledgement ACK−.

In this example, the Card Manager CM summarises the acknowledgements and sends a global acknowledgement ACK (+,−) also in the form of an APDU frame to the trusted operating system, thereby terminating the acknowledgement waiting step E300.

In this example, as mentioned previously, the applications of the Rich-OS operating system have access to the SIM card 20 without necessarily mobilising the trusted operating system.

As a variant, the trusted operating system could be a systematic intermediary between the Rich-OS operating system and the secure element i.e. the SIM card 20.

The disabling steps of the secure functions on the SIM card 20 could then entail integrating a communication controlling component (Secure Element Access Controller) in the trusted operating system. This controller acts as filter and applies a predefined security policy. When a security anomaly is detected, this security policy may for example block requests originating from the Rich-OS operating system requesting access to secure functions via the trusted operating system.

What is claimed is:

1. An electronic assembly for an electronic device, the electronic assembly comprising:
    a processor;
    a memory;
    a detection module to detect a security anomaly of a Rich-OS operating system, wherein the detection module performs a calculation of a fingerprint of a specific series of octets in at least one level of the Rich-OS operating system and compares the fingerprint with a reference fingerprint;
    a disabling module which in response to said detection disables at least one secure function of said electronic device used by applications of the Rich-OS operating system, by performing operations comprising:
        sending a disabling instruction to the at least one secure function, and
        waiting for an acknowledgement of disablement of the at least one secure function; and
    a trusted operating system comprising the detection module and the disabling module, the trusted operating system and the Rich-OS operating system being stored in the memory of the electronic assembly, and being executed on the electronic assembly.

2. The electronic assembly according to claim 1, wherein the security anomaly is corruption of the Rich-OS operating system.

3. The electronic assembly according to claim 1, wherein the detection module is capable of receiving a message containing a securing command.

4. The electronic assembly according to claim 1, wherein the at least one secure function comprises of at least one chosen from a group consisting of:
    an application of a secure element, executed by the electronic device; and
    a function providing access to at least one sensitive data item of a secure element, the at least one sensitive data item being accessible to the electronic device.

5. The electronic assembly according to claim 1, wherein the trusted operating system takes steps to ensure the security of said electronic device when the acknowledgement is negative.

6. The electronic assembly according to claim 1, wherein the detection module is activated in response to verification of the security of the electronic device, triggered by at least one chosen from a group consisting of:
    on the initiative of the trusted operating system,
    on start-up of the electronic device,
    at regular intervals, and
    on the initiative of a user of said electronic device.

7. A terminal comprising:
    an electronic assembly comprising:
        a processor;
        a memory;
        a detection module to detect a security anomaly of a Rich-OS operating system, wherein the detection module performs a calculation of a fingerprint of a specific series of octets in at least one level of the Rich-OS operating system and compares the fingerprint with a reference fingerprint;
        a disabling module which in response to said detection disables at least one secure function of said electronic device used by applications of the Rich-OS operating system, by performing operations comprising:
            sending a disabling instruction to the at least one secure function, and
            waiting for an acknowledgement of disablement of the at least one secure function; and
        a trusted operating system comprising the detection module and the disabling module, the trusted operating system and the Rich-OS operating system being stored in the memory of the electronic assembly, and being executed on the electronic assembly.

8. The terminal according to claim 7, wherein the terminal is a mobile telephony terminal.

9. A method for securing an electronic device comprising a processor, the method comprising:
    detecting, by the processor of the electronic device, a security anomaly of a Rich-OS operating system, wherein the detecting comprises calculating a fingerprint of a specific series of octets in at least one level of the Rich-OS operating system and comparing the fingerprint with a reference fingerprint; and
    disabling, by the processor of the electronic device and in response to the detecting, at least one secure function of said electronic device, by performing operations comprising:
        sending a disabling instruction to the at least one secure function, and
        waiting for an acknowledgement of disablement of the at least one secure function;
    wherein the method is implemented using a trusted operating system comprising a module that performs said detecting and a module that performs said disabling, and the trusted operating system and the Rich-OS operating system are executed on the electronic device.

10. A non-transitory computer-readable medium comprising instructions that, when executed by a processor of an electronic assembly, perform a method comprising:
    detecting, by the processor of the electronic assembly, a security anomaly of a Rich-OS operating system, wherein the detecting comprises calculating a fingerprint of a specific series of octets in at least one level of the Rich-OS operating system and comparing the fingerprint with a reference fingerprint; and disabling, by the processor of the electronic assembly and in response to the detecting, at least one secure function of an electronic device, by performing operations comprising:

sending a disabling instruction to the at least one secure function, and waiting for an acknowledgement of disablement of the at least one secure function;

wherein the detecting and the disabling are implemented using a trusted operating system comprising a module that performs said detecting and a module that performs said disabling, and the trusted operating system and the Rich-OS operating system are executed on the electronic assembly.

11. The non-transitory computer-readable medium according to claim 10, wherein the method is included in the trusted operating system.

12. The non-transitory computer-readable medium according to claim 10, wherein the method is included in a patch on said trusted operating system.

13. The non-transitory computer-readable medium according to claim 10, wherein the method is included in an application implementation-dependent on said trusted operating system.

* * * * *